United States Patent [19]
Jackson et al.

[11] 3,876,239
[45] Apr. 8, 1975

[54] FIFTH WHEEL SAFETY DEVICE

[75] Inventors: Dick Jackson, Seagoville; Robert H. Jones, Euless; Buster M. Steen, Seagoville; Newton P. Whaley, Carrollton; Stuard E. Boswank, Garland, all of Tex.

[73] Assignee: Southwest Wheel and Manufacturing Company, Dallas, Tex.

[22] Filed: Aug. 5, 1974

[21] Appl. No.: 494,977

[52] U.S. Cl. .............................. 280/432; 280/434
[51] Int. Cl. .......................................... B62d 53/10
[58] Field of Search ...................... 280/434, 432

[56] References Cited
UNITED STATES PATENTS

| | | | |
|---|---|---|---|
| 2,294,710 | 9/1942 | Berg et al. | 280/432 |
| 2,726,878 | 12/1955 | Fontaine | 280/434 |
| 2,861,818 | 11/1958 | Kayler et al. | 280/434 |
| 2,885,222 | 5/1959 | Walther et al. | 280/434 UX |
| 3,318,616 | 5/1967 | Fontaine et al. | 280/434 |
| 3,600,006 | 8/1971 | Slaven | 280/434 |

Primary Examiner—Leo Friaglia
Attorney, Agent, or Firm—Richards, Harris & Medlock

[57] ABSTRACT

Disclosed is a fifth wheel apparatus for use in coupling a trailer to a vehicle. The fifth wheel has a body with a spring loaded pivotal jaw for closing and engaging a kingpin. A spring loaded bolt is provided to engage and retain the jaw in position. The bolt is manipulated by a cam plate having a first unlocked position wherein the jaw is free to rotate, a second latching position whereby said jaw is free to rotate to and is retained in the closed position, and a third locked position wherein the jaw is fixed in the closed position. A slidable pin is provided for movement to a position simultaneously engaging the jaw and cam when in the third position.

14 Claims, 10 Drawing Figures

FIFTH WHEEL SAFETY DEVICE

BACKGROUND OF THE INVENTION

The present invention relates to improvements in fifth wheel apparatus for use in coupling trailers to towing vehicles. More particularly, the present invention relates to improvements in the locking structure of fifth wheels.

In the towing of a trailer by a pickup truck, tractor or the like, it is common to use a fifth wheel mounted on the frame of the towing vehicle to couple the trailer to the vehicle. A kingpin is usually mounted on the trailer and is provided with a groove which locks into a slot on the fifth wheel. The pin is releasably held in place by a movable jaw on the fifth wheel. Conventionally, these jaws pivot to couple the kingpin to the fifth wheel and a slidable bolt engages the jaws to hold the same in a locked position.

It is desirable that fifth wheel assemblies be safe to operate. For example, they must avoid what is known as a false latch. A false latch results when the jaw does not completely lock in place. This can produce a very dangerous situation when towing a trailer in that jaw might open during use.

In addition, forces are applied to the jaw during towing, and in some cases have caused the jaw to open, disconnecting the trailer from the vehicle during use. Therefore, the provision of a safe fifth wheel structure is desirable.

According to the present invention, an improved fifth wheel structure is provided having a jaw with a latching apparatus thereon which eliminates the possibility of a false latch and positively retains the jaw in place to prevent the hazardous unlatching of the trailer during towing.

More specifically, according to the present invention, an improved fifth wheel is provided having a body with a groove therein for receiving a kingpin and a rotatable jaw for engaging the kingpin and holding the kingpin in the groove. A bolt is resiliently urged in a direction to contact the jaw and lock the jaw in the closed or towing position. A cam follower is mounted on the bolt to engage a movable cam on the body of the fifth wheel. The cam is provided with a handle for moving the same to engage the bolt and move the bolt between a first unlocked position wherein the jaw is free to rotate, a second latching position wherein the bolt partially extends in the path of the jaw and whereby the jaw engages the bolt and axially moves the same to allow latching of the bolt, and a third locked position whereby the bolt is rigidly held in the locked position engaging the jaw. A pin movable only when the jaw is in the locked position is provided. The pin simultaneously engages the jaw to prevent locking of the jaw upon failure or movement of the bolt and engages the cam to prevent undesirable movement of the cam without movement of the pin.

Other features and advantages of the present invention will be readily appreciated by those of ordinary skill in the art as the same becomes better understood by reference to the following detailed description when considered in connection with the accompanying Drawings in which:

BRIEF DESCRIPTION OF THE DRAWINGS

FIG. 3 is a section of the device taken on line 3—3 of FIG. 2, looking in the direction of the arrows;

FIG. 4 is a section of the device taken on line 4—4 of FIG. 2, locking in the direction of the arrows;

FIG. 10 is an enlarged partial section view taken on line 10—10 of FIG. 4, looking in the direction of the arrows.

DESCRIPTION OF THE PREFERRED EMBODIMENT

Figure 1:
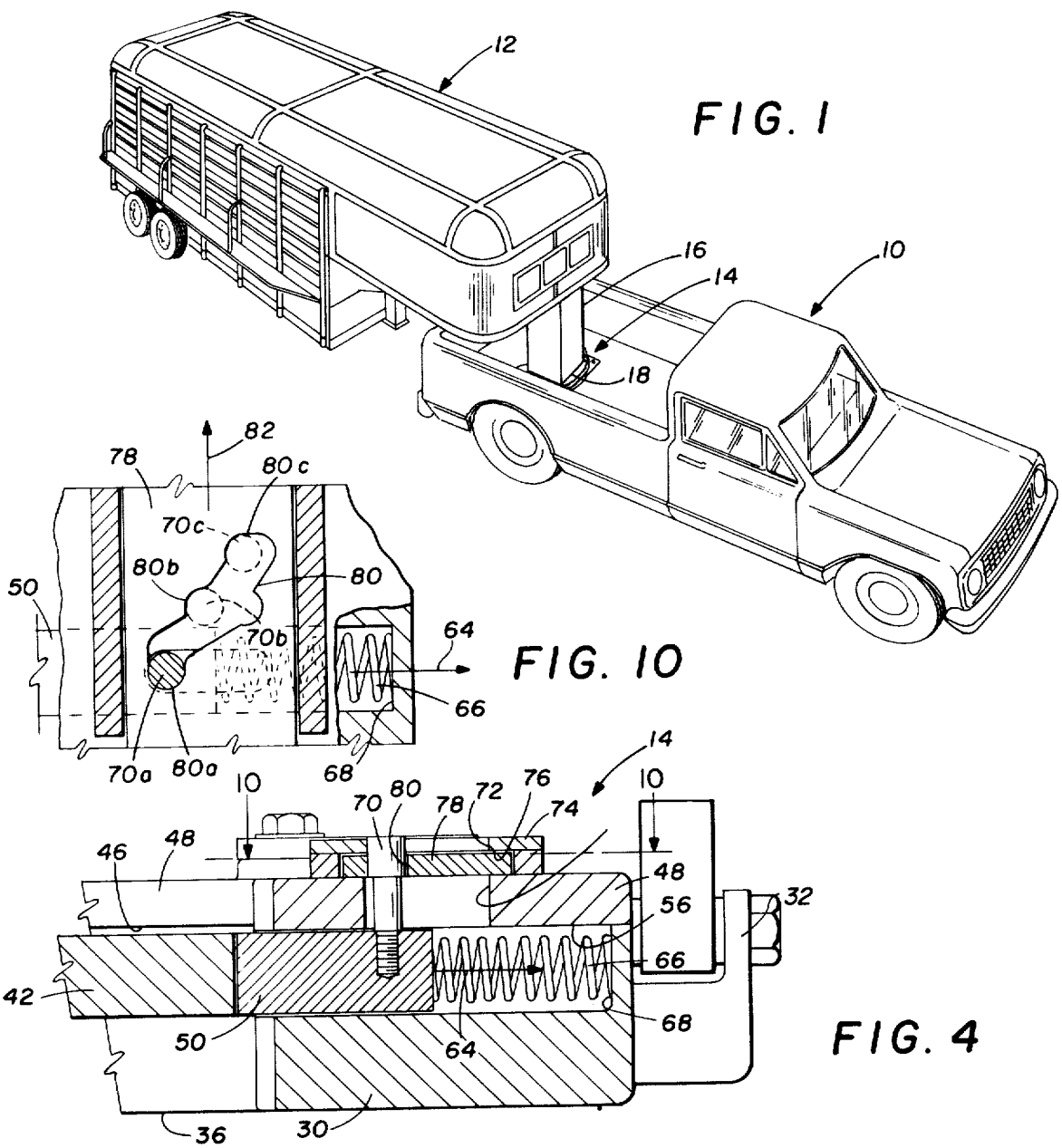
FIG. 1 is a perspective view of the improved fifth wheel of the present invention mounted on a conventional truck and used to attach a conventional trailer thereto.

Referring now to the Drawings wherein like reference characters designate like or corresponding parts throughout the several views, there is illustrated in FIG. 1, a conventional towing vehicle, such as a pickup 10, coupled to a conventional trailer 12 by means of the improved fifth wheel assembly 14 of the present invention. It is to be understood, of course, that the present invention has application to other environments wherein towing vehicles other than pickup trucks are used. In addition, other types of trailers could be used, such as flatbed trailers, covered camp trailers or the like. The illustrative trailer 12 is provided with a desecending vertical frame portion 16 adjacent the front thereof. This frame portion 16 is provided with a rub plate 18 on the bottom thereof for resting on the fifth wheel assembly 14. A kingpin 20 (not shown in FIG. 1) extends vertically downward from the rub plate 18 and is engaged by the fifth wheel assembly 14 as will be hereinafter described. The rub plate 18 vertically supports the trailer while the kingpin 20 transmits thrust to the trailer while allowing rotation thereof.

It is to be understood, of course, that the location of the fifth wheel and the kingpin can be reversed with the kingpin 20 on the bed of the truck 10 and the fifth wheel 14 mounted on the trailer 12.

Figure 2:
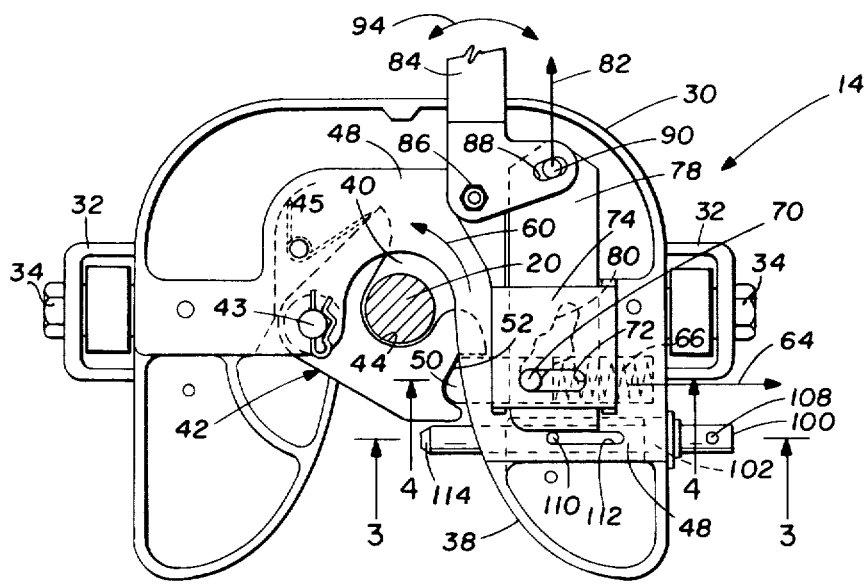
FIG. 2 is a bottom plan view of the fifth wheel shown in the locked position.
Figure 5:
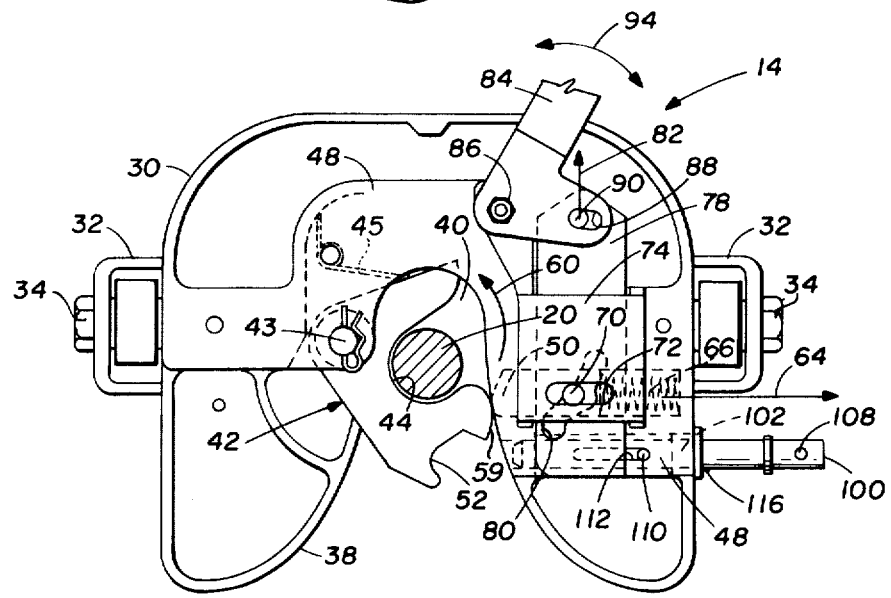
FIG. 5 is a bottom plan view illustrating the fifth wheel in the latching position.
Figure 6:
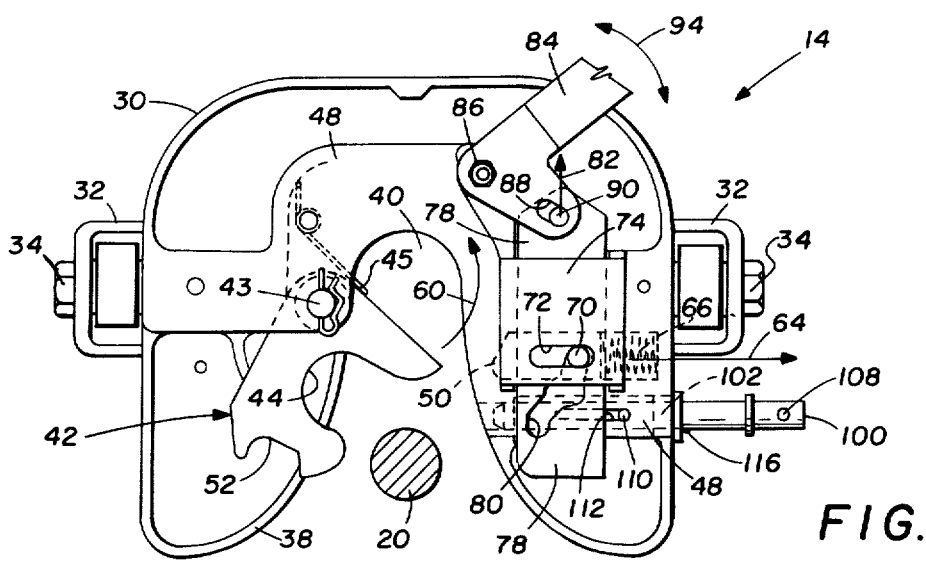
FIG. 6 is a bottom plan view of the improved fifth wheel of the present invention shown in the unlocked position.

The details of the construction of the improved fifth wheel assembly 14 of the present invention are illustrated in FIGS. 2-10. In FIGS. 2, 5 and 6, the bottom of assembly 14 is shown; while in FIGS. 7-9, the top is shown. The fifth wheel assembly 14 has a body 30 which can be formed in a conventional manner, such as by casting. The body 30 is provided with a pair of ear portions 32 for use in attaching the assembly to a truck, trailer, or the like. The portions 32 can be provided with bores 33, through which the body 30 may be attached by fasteners 34 to pivot about a horizontally extending axis. This pivotal movement can be limited by stops not shown. Openings 35 extend down through the upper surface of body 30. These openings 35 have bottom surfaces which align with the extending end of fastener 34, and have surfaces which engage and prevent rotation of a nut engaging fastener 34.

The body 30 has an upper contact surface 36 and a groove 38 on the front side thereof. The contact surface 36 is provided to engage the rub plate 18. The walls of the groove 38 taper to form a socket portion 40. This socket portion 40 is of a size and shape to receive the kingpin 20 therein while allowing rotation about the axis of the kingpin 20.

A jaw 42 is mounted on the body to rotate about a vertically extending shaft 43. This jaw 42 is mounted in a space 46 formed between a flange 48 and the body 30. Flange 48 is parallel to and spaced away from the body 30 and is connected thereto by suitable ribs. A torsion spring 45 is provided to normally urge jaw 42 in the open direction.

The jaw 42 is provided with a groove 44 extending therethrough. This groove 44 cooperates with the socket portion 40 to define a relatively circular space into which the kingpin 20 is retained when the jaw is in the locked position.

Figure 7:
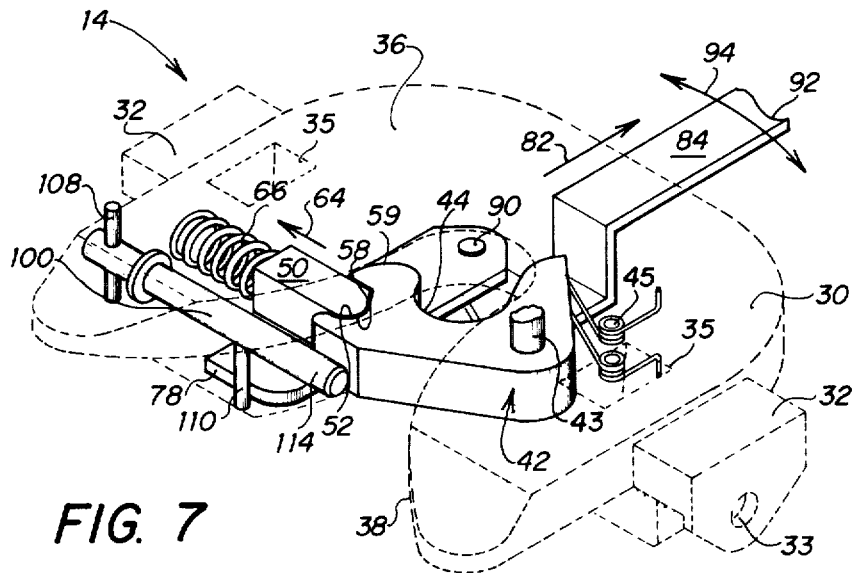
FIG. 7 is a top perspective view of the improved fifth wheel of the present invention with the body of the fifth wheel shown in dotted lines and with the fifth wheel in the locked position.
Figure 9:
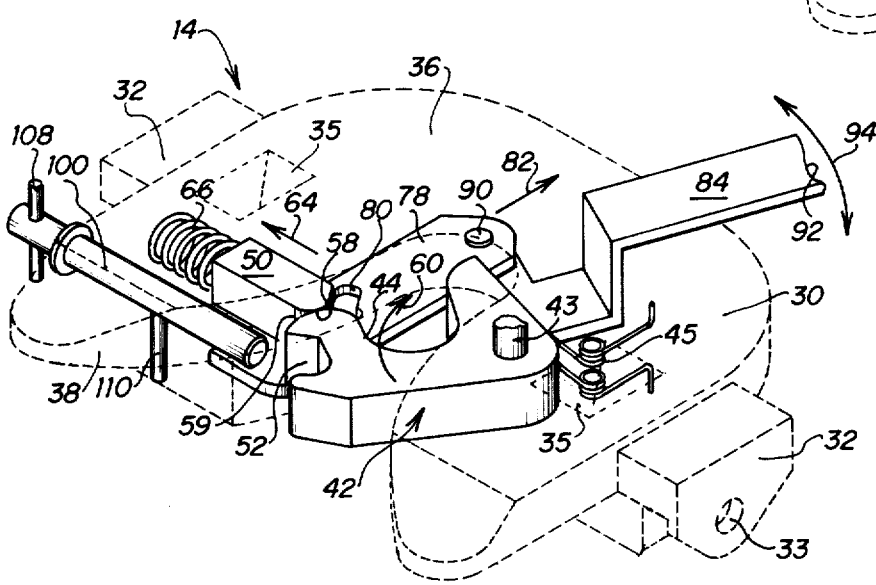
FIG. 9 is a view similar to FIGS. 7 and 8 illustrating the improved fifth wheel of the present invention in the latching position.

In FIGS. 2 and 7, the jaw 42 is shown retained in the locked position by a bolt 50 engaging a latching groove 52 on the jaw. The bolt 50 is slidably mounted in an enclosure 56 formed between the flange 48 and body 30. The bolt 50 has an arcuate end 58. The jaw 42 has an arcuate surface 59 positioned to contact the arcuate end 58 of bolt 50 as shown in FIGS. 5 and 9. The interaction between the surfaces 58 and 59 during rotation of the jaw in the direction of arrow 60 will cause the bolt 50 to move in the direction of arrow 64 within the enclosure 56. This movement of the bolt 50 in the direction of arrow 64 will compress a spring 66 positioned within the enclosure 56 between the bolt 50 and a bottom wall 68.

Compression spring 66 normally contacts the bolt 50 to resiliently urge the bolt 50 to move in the reverse direction of arrow 64. A pin 70 is fixed on the bolt 50 to extend in a downward direction therefrom. This pin is best illustrated in FIGS. 2–6 as extending in a downward direction through a slot 72 in plate 74. Plate 74 is attached to the body 30 in a spaced parallel position from the upper surface of flange 48. Plate 74 defines an elongated socket 76 formed in the underside thereof for receiving a cam plate 78 as will be hereinafter described. An unusual-shaped slot 80 is formed in the cam plate 78 to allow the pin 70 to extend therethrough.

Movement of bolt 50 in the forward and reverse directions of arrow 64 is limited in extent by the slot 72 in plate 74. The position of the pin 70 (and bolt 50) within the slot 72 is controlled by contact between the walls of the slot 80 in the plate 78 and pin 70. Thus, the walls of slot 80 act as cam surfaces while the pin 70 acts as a follower to control the position of bolt 50.

Cam plate 78 reciprocates in the socket 76 in the forward and reverse directions of arrow 82. A crank arm assembly 84 is pivotally connected to the body 30 at 86 and has a slot 88 which engages a pin 90 on the cam plate 78. A handle 92 is provided on the end of the crank arm 84 opposite the slot 88. This handle 92 allows the crank arm to be grasped and rotated in the direction of arrows 94.

Thus, by grasping the handle 92 and rotating the arm 84 in the direction of arrows 94, the slot 88 in the arm will engage pin 90 and will in turn cause cam plate 78 to move in the forward and reverse directions of arrow 82 within the socket 76. The cam plate 78 and the slot 80 therein will engage the pin 70 of the bolt 50 and move the bolt in the forward and reverse directions of arrow 64. Thus, the bolt 50 can be manipulated to selectively engage and lock the jaw 42 in position as desired.

The detailed shape of the slot 80 in cam plate 78 is shown in FIG. 10. The slot 80 is elongated and has three distinct portions, i.e., a locked portion 80a, a latching portion 80b, and an unlocked portion 80c. As can be seen when the plate is moved to its extremity in the direction of arrow 82, the pin 70 will move into the locked portion 80a and will assume the position illustrated by 70a. In this position, the bolt 50 is moved to its extremity in the reverse direction of arrow 64, and as previously described, engages latching groove 52 in jaw 42 to hold the jaw 42 in the locked position. The slot 80 is narrow in area 80a and conforms closely with pin 70a. This prevents movement of pin 70a or bolt 50 in the direction of arrow 64, thus insuring a positive lock of jaw 42.

When it is desired to open the jaw 42, the handle 92 is operated to move plate 78 to its extremity in the reverse direction of arrow 82. The pin 70 will move into unlocked portion 80c and will assume the position illustrated by 70c. This movement of the pin to 70c will in turn move the bolt in the direction of arrow 64 to disengage the end of the bolt 50 from the latching groove 52 on jaw 42.

To latch the jaw 42, the plate 78 is moved in the direction of arrow 82 until the pin 70 is in the latching portion 80b. The pin will then assume the position identified by 70b. In this position, the bolt 50 extends into the path of the jaw 42 a sufficient distance to contact surface 59 and slightly extend into groove 52. In area 80b, the groove 80 has sufficient width to allow some movement of the pin 70b and bolt 50 in the direction of arrow 64. This movement allows the bolt 50 to be moved in the direction of arrow 64 during latching because of engagement between surfaces 58 and 59. This movement and the spring 66 also allows the bolt 50 to snap into place in groove 52 once the jaw 42 is moved to the latched position. Then, the cam plate 78 can be moved to the locked position. Thus, it can be seen that the cam plate 78, groove 80 and pin 70 control and limit the movement of bolt 50.

According to a specific feature of the present invention, a locking pin 100 is mounted on the body 30 adjacent to cam plate 78. Pin 100 is slidably in the body 30 through a bushing 102 and a bore 104. The bushing 102 is supported from the body 30 and allows the pin 100 to axially slide through the bushings in the forward and reverse direction of arrow 64. Pin 100 has a handle portion 108 for use in moving the pin. A pin 110 is attached to the pin 100 adjacent to the middle thereof. Pin 110 extends at a right angle with respect to the length of the pin 100. As can be seen in FIG. 3, the pin 110 extends from the pin 100 up through a slot 112 in the flange 48 and to the level of the cam plate 78.

Figure 8:
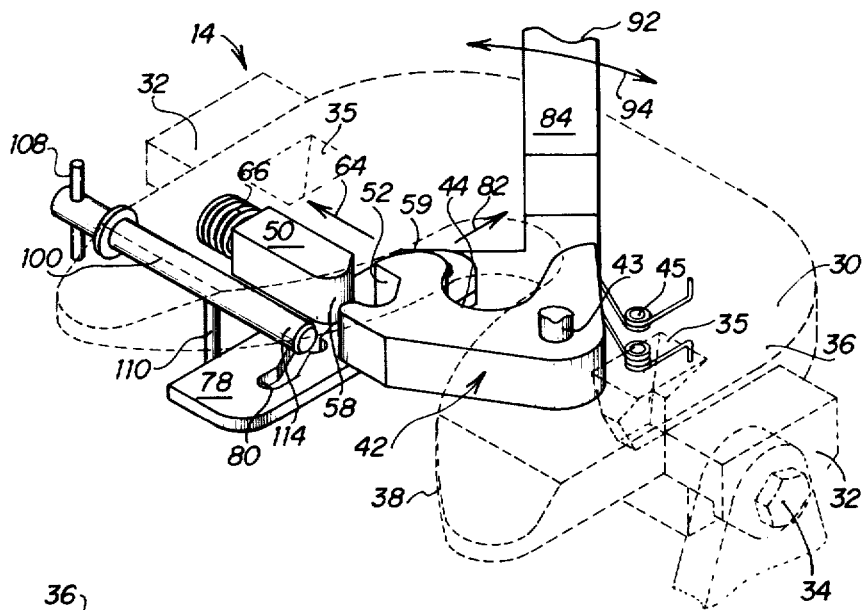
FIG. 8 is a view similar to FIG. 7 with the fifth wheel shown in the unlocked position.

The pin 100 is movable between the position shown in solid lines in FIG. 3 and identified by reference numeral 100 and the position shown in dotted lines and identified by reference numeral 100'. The position identified as 100 is the safety position while the position identified as 100' is the released position. When the pin 100 is in the safety position, pin 110 will extend up into the path of the cam plate 78 and as can be seen in FIGS. 2, 3 and 7, pin 110 prevents the movement thereof in the reverse direction of arrow 82. In addition, end 114 of the pin 100 is of sufficient length to extend to engage the jaw 42 when the pin is in the position 100. This end 114 will engage the jaw 42 and retain it in the locked position. In FIGS. 6 and 8, it can be seen that when the pin is in the position 100', end 114 clears the end of the jaw 42 and allows the jaw to freely rotate in a reverse direction of arrow 60.

A ball detent 116 is carried by pin 100. The operation of this ball detent 116 can best be explained by reference to FIG. 3. In FIG. 3, the pin 100 and detent 116 are shown in the safety and unlocked positions. The detent is identified by 116 in the safety position and by 116' (shown in dotted lines) in the unlocked position. It is important to note that the bushing 102 spans the space between positions 116 and 116'. Thus, the detent 116 must be compressed to pass through the bushing 102 and assists in retaining the pin in positions 100 and 100'.

OPERATION OF THE DEVICE

The advantages and features of the present invention can be more readily appreciated from a description of the operation of the present device.

To couple the truck 10 and trailer 12, the truck and trailer are first aligned. The fifth wheel 14 is in the unlocked position illustrated in FIGS. 6 and 8. The handle 92 is then rotated to the open position illustrated in FIGS. 5 and 9. In this position, the cam plate 78 is moved so that pin 70 is in position 70b in slot 80 (see FIG. 10). In this position, bolt 50 is in the latching position, free to move in the direction of arrow 64 to the extent that pin 70b can move in portion 80b.

Next, the truck 10 is then backed in a direction toward the trailer 12 until the kingpin 20 engages the walls of the groove 38 and is guided into the groove 44 on the jaw 42. Continued backing of the vehicle 10 will cause jaw 42 to rotate in the direction of arrow 60 with the surface 59 on jaw 42 contacting the arcuate end 58 of the bolt (FIG. 5) forcing the bolt to move in the direction of arrow 64 as the vehicle continues to move in the directon toward the trailer 12. This rotation of the jaw 42 continues until spring 66 and bolt 50 snap into latching groove 52 (illustrated in dotted lines in FIG. 5). The handle 92 can then be rotated to move cam plate 78 to engage and move the pin 70a to portion 80a (see FIG. 10). In this position, the bolt 50 is held in the locked position by portion 80a. The pin 100 is then moved in the reverse direction of arrow 64 with the pin 110 engaging the end of the cam plate 78 and the end 114 engaging the jaw 42 to prevent rotation thereof. It is important to note that pin 100 cannot be moved into this safety position unless the cam plate 78 and jaw 42 are in the locked position. This interaction of pin 100, plate 78, and jaw 42 eliminates the risk of a false or incomplete coupling. The trailer is then coupled and ready for movement.

In addition, the pin 100 engages the jaw 42 in the closed position to provide a redundant lock in the event the bolt 50 should fail.

To uncouple the trailer, the pin 100 is moved to position 100' (FIG. 3) and the handle 92 is operated to move cam plate 78 to the unlocked position. The bolt is disengaged from jaw 42, freeing the jaw 42 to move to the open position.

Thus, an improved safe fifth wheel is disclosed. It is envisioned that alterations and modifications could be made by those of ordinary skill in the art without departing from the spirit and scope of the invention as set forth in the appended claims.

What is claimed is:

1. A fifth wheel for use with a kingpin, comprising: a rigid body, ear portions formed on said body for pivotally mounting said body, a kingpin receiving socket formed in said body, a jaw pivotally mounted on said body to cooperate with said socket and move to a closed position to releasably engage and lock said kingpin in said socket whereby said kingpin is free to axially rotate in said socket, a bolt slidably mounted on said body for selective engagement with said jaw, a compression spring resiliently urging said bolt in a direction to contact said jaw, a cam follower on said bolt, a cam plate slidably mounted on said body, a cam surface on said body engaging said cam follower on said bolt, a selectively operable crank arm on said body for moving said cam plate to thereby move said bolt between a first unlocked position wherein the jaw is free to rotate with respect to said bolt and socket to release the kingpin from said socket, a second latching position whereby said jaw is free to receive the kingpin entering said socket and rotate in response to movement of the kingpin in a direction into the socket, to and be retained in the closed position by said bolt, and a third locking position wherein the jaw and bolt are held fixed in said closed position by said cam surface, and a selectively operable pin axially slidable in said body for movement between a safety position engaging said jaw and said cam plate in said third position wherein movement of said jaw and said cam plate from the third position is prevented and a released position wherein movement of said jaw and cam plate is permitted to release the kingpin.

2. A fifth wheel apparatus for use with a kingpin in coupling vehicles to trailers and the like, comprising:
    a rigid body;
    a jaw mounted on said body for movement into and out of a locked position engaging said kingpin whereby said kingpin is free to axially rotate with respect to said body while axial and radial translation of said kingpin with respect to said body is limited;
    a selectively operable bolt mounted on said body for moving into and out of a first position contacting said jaw and preventing movement of said jaw from said locked position; and
    a selectively operable redundant latch means mounted on said body for movement into and out of a locked position contacting and preventing movement of said bolt from said first position and positioned to contact said jaw and limit movement thereof from said locked position upon failure of said bolt.

3. The fifth wheel of claim 2 wherein said redundant latch means comprises an axially movable pin, said pin having a portion selectively engaging said jaw and a portion selectively restricting movement of said bolt from said first position.

4. The fifth wheel of claim 3 further comprises a cam plate, a cam follower carried by said bolt and a cam surface formed on said cam plate whereby movement of said bolt is accomplished.

5. A fifth wheel apparatus for use with a kingpin in coupling vehicles to trailers and the like, comprising:
  a rigid body;
  a jaw mounted on said body for movement into and out of a locked position engaging said kingpin whereby said kingpin is free to axially rotate with respect to said body while axial and radial translation of said kingpin with respect to said body is limited;
  a selectively operable bolt mounted on said body for moving into and out of a locked position contacting said jaw and preventing movement of said jaw from said locked position; and
  means contacting said bolt for preventing said bolt from moving into said locked position when said jaw is not in said locked position, said contacting means comprising:
  a cam plate slidably mounted on said body for engagement with said bolt; and
  a selectively operable locking pin slidably mounted on said body for selective engagement with said jaw and said cam plate to prevent movement of the jaw and bolt from their locked position.

6. A fifth wheel apparatus for use with a kingpin in coupling vehicles to trailers and the like, comprising:
  a rigid body, a bearing surface on said body for engaging said kingpin;
  a jaw mounted on said body for movement between an open position and a closed position whereby said kingpin is connected to said body and is free to axially rotate with respect to said jaw;
  a bolt mounted on said body for contacting said jaw;
  selectively operable means for engaging said bolt and moving said bolt between:
  a first unlocked position wherein said bolt is positioned on said body away from contact with said jaw whereby said jaw is free to move between said open and closed positions,
  a second latching position wherein said bolt is positioned on said body to contact said jaw and move from the path of said jaw when said jaw moves in a direction from said open to said closed position whereby movement of said jaw into said closed position is permitted, and to contact and remain in the path of movement of said jaw in a direction from said closed position whereby movement of said jaw from said closed position is prevented,
  a third locked position wherein said bolt is fixed in position on said body in contact with said jaw whereby movement of said jaw from said closed position is prevented, and
  a selectively operable locking pin movably mounted on said body for selective engagement with said jaw and selectively operable means to prevent movement of said jaw and said last named means from their locked position.

7. The fifth wheel of claim 6 wherein said selectively operable means comprises a cam plate carrying a cam surface, a cam follower on said bolt for engaging said cam surface.

8. The fifth wheel of claim 7 further comprises a redundant latch means having a portion for selectively contacting said cam plate and preventing movement thereof when in said third position.

9. The fifth wheel of claim 8 wherein said redundant latch means further comprises a second portion for selectively contacting and preventing movement of said jaw when in said third position.

10. The fifth wheel of claim 6, additionally comprising resilient means contacting said bolt in said second position.

11. In a fifth wheel apparatus for use with a kingpin in coupling vehicles to trailers and the like, having a rigid body, a bearing surface on said body for engaging said kingpin, a jaw mounted on said body for movement between an open position and a closed position whereby said kingpin is connected to said body and is free to axially rotate with respect to said jaw, a bolt mounted on said body for contacting said jaw,
  the improvement which comprises a selectively movable cam plate with cam surfaces thereon and a follower on said bolt engaging said surface for moving said bolt between:
  a first unlocked position wherein said bolt is positioned on said body away from contact with said jaw whereby said jaw is free to move between said open and closed positions,
  a second latching position wherein said bolt is positioned on said body to contact said jaw and move from the path of said jaw when said jaw moves in a direction from said open to said closed position whereby movement of said jaw into said closed position is permitted, and to contact and remain in the path of movement of said jaw in a direction from said closed position whereby movement of said jaw from said closed position is prevented, and
  a third locked position wherein said bolt is fixed in position on said body in contact with said jaw whereby movement of said jaw from said closed position is prevented said cam surfaces having respective cam portions corresponding to each said first, second and third positions constituting the sole means for maintaining the bolt and its follower in said respective positions.

12. The fifth wheel of claim 11 further comprises a redundant latch means having a portion for selectively contacting said cam plate and preventing movement thereof when in said third position.

13. The fifth wheel of claim 12 wherein said redundant latch means further comprises a second portion for selectively contacting and preventing movement of said jaw when in said third position.

14. The fifth wheel of claim 11 additionally comprising resilient means contacting said bolt in said second position.

* * * * *